March 18, 1941.   C. R. PUGH   2,235,331
ARTIFICIAL BAIT
Filed May 17, 1940
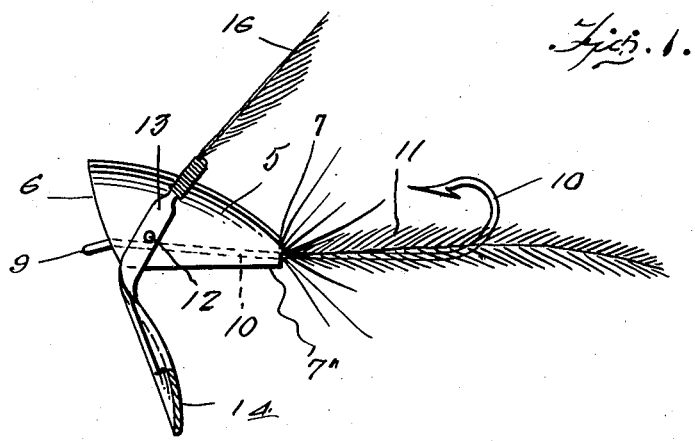
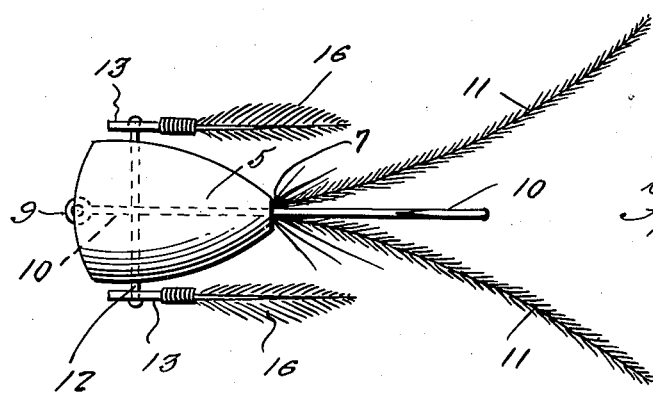
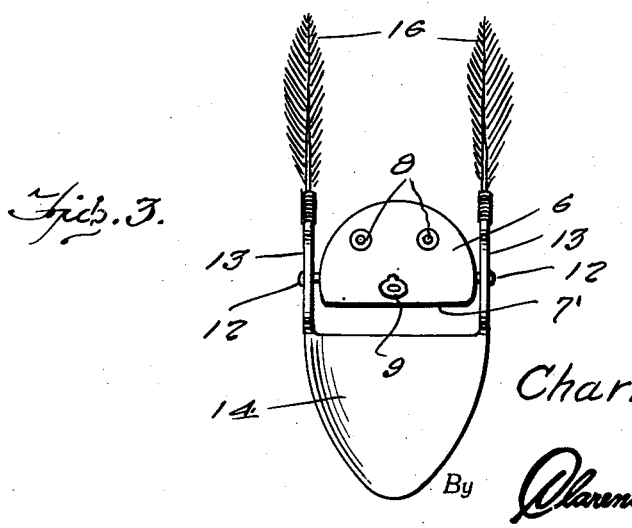
Inventor
Charles R. Pugh
By Clarence A. O'Brien
Attorney Patented Mar. 18, 1941

2,235,331

UNITED STATES PATENT OFFICE 2,235,331

ARTIFICIAL BAIT

Charles R. Pugh, Terre Haute, Ind.

Application May 17, 1940, Serial No. 335,825

1 Claim. (Cl. 43—48)

This invention relates to artificial bait, and has for the primary object the provision of a device of this character which will simulate live bait when moved in the water, such as a large size winged bug or other insect which is in the water and is attempting to rise from the water so that a fish will be attracted thereto.

Another object of this invention is the provision of a device of the above stated character wherein the construction thereof is such that it will not catch readily into weeds and other water growth and other obstructions, consequently permitting the device to be used in and about water growths and obstructions where fish are mostly found without danger of fouling.

With these and other objects in view as will become more apparent as the description proceeds, the invention consists in certain novel features of construction, combination and arrangement of parts which will be hereinafter more fully described and claimed.

For a complete understanding of my invention, reference is to be had to the following description and accompanying drawing, in which—

Figure 1 is a side elevation, partly in section, illustrating an artificial bait constructed in accordance with my invention.

Figure 2 is a top plan view illustrating the device.

Figure 3 is a front elevation illustrating the device.

Referring in detail to the drawing, the numeral 5 indicates a body constructed of any desirable buoyant material. The body has a substantially blunt front end 6 and tapers from said end towards its rear end 7. Further, the body is provided with a flat bottom face 7' and arcuately curved top and side walls. The blunt front end 6 forms the face to the body and may have painted or otherwise applied thereon imitation eyes 8 and also has secured to the front face an eye type fastener 9 to permit the attaching of a fishing line thereto or a swivel of the leader conventionally used in the attaching of fish lures to a line. The eye 9 may form an integral part of a fish hook 10.

The fish hook 10 has the shank thereof secured in the body with the bill portion of the fish hook directed upwardly at the rear end of the body so as to be disposed in a plane well above the flat bottom face of the body. Also secured to the rear end 7 of the body are feathers 11 arranged to conceal the shank and the hook from the under face of the device.

A pin 12 extends transversely through the body 5 just rearwardly of the front end and slightly above the bottom wall and has pivotally mounted thereon arms 13 of rigid construction. The arms form an integral part of a plate 14 so positioned as to swing freely under the body. The front face of the plate is concaved and further the plate tapers towards its free end.

By referring to Figure 3 it will be seen that the plate 14 forms a connection between the arms 13 and any movement of the plate in the water causes the arms to pivot and secured to the upper ends of the arms are feathers 16 representing wings.

Thus it will be seen that the body and feathers simulate a winged bug or insect. The plate depending from the body, as shown in Figure 1, when the latter is in the water, will cause the body to float in a proper position and any movement of the body through the water brings about pivotal movement of the arms due to the arrangement of the plate 14. The pivotal movement of the arms moves the feathers 16 which represent the wings, consequently causing the device to take on the appearance of a bug or insect attempting to rise from the water. The device having the appearance and action of an insect attempting to rise from the water will readily attract fish thereto and thereby provide an artificial bait which will be quickly taken by a fish.

The plate depending for pivotal movement from the body will readily pass over obstructions or water growths and have a tendency to lift the body and prevent the latter from becoming entangled with the growth and also the hook having the bill portion directed upwardly will be less liable to catch in the water growths or other obstructions. In view of the fact that this device will not readily catch into water growths and other obstructions will permit its use successfully about such growths and obstructions and where it is desirable to use bait owing to the natural tendency of fish to stay in and about the water growths or the like.

While I have shown and described the preferred embodiment of my invention, it will be understood that minor changes in construction, combination and arrangement of parts may be made without departing from the spirit and scope of the invention as claimed.

Having thus described the invention, what I claim is:

A fish lure comprising a body tapering from its front end toward its rear end and having a flat bottom face and a blunt front face sloping in a rearward direction, a hook having the shank thereof secured in the rear end of the body, tail feathers secured in the rear end of the body and arranged about the hook, said hook having the bill portion thereof directed upwardly to be positioned in a plane above the bottom face of the body, feathered wing elements pivotally mounted on opposite sides of said body adjacent to the blunt front face and the flat bottom face, and a plate connecting said wing elements and movable under the bottom face of the body and tapering toward the free end and having a concave front face, said plate adapted to impart movement to the wing elements on the movement of the body through the water and act to stabilize said body in a floating position in the water.

CHARLES R. PUGH.